Dec. 8, 1925.
L. G. COPEMAN
1,564,947
BUSHING CONSTRUCTION
Filed June 25, 1923
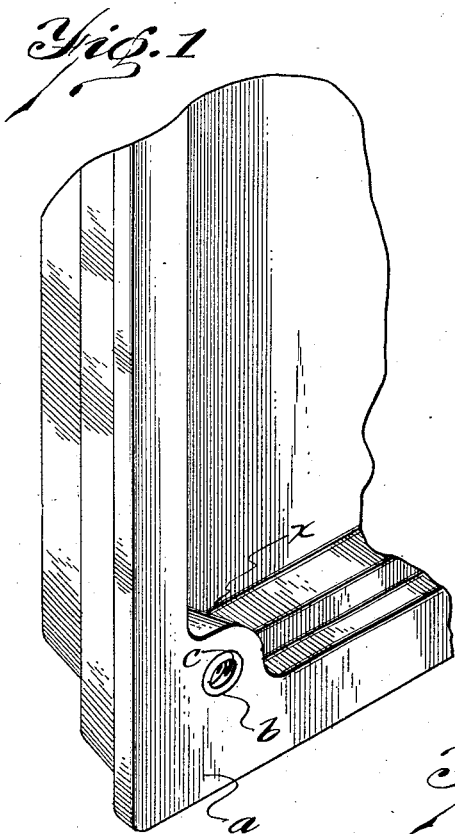
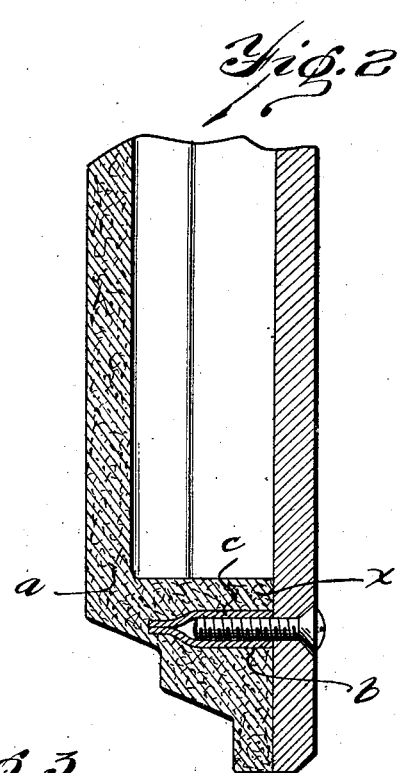
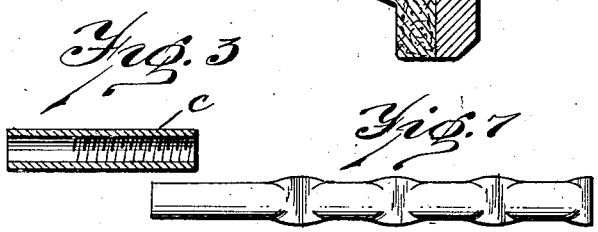
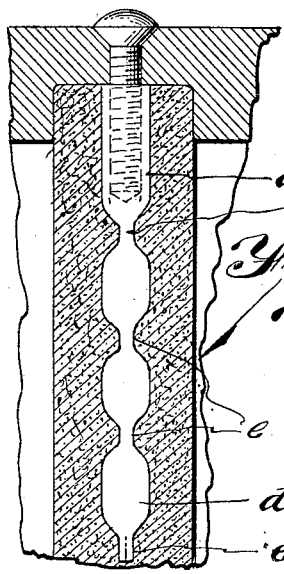
Inventor
Lloyd G. Copeman
By Stuart C. Barnes
Attorney Patented Dec. 8, 1925.

1,564,947

UNITED STATES PATENT OFFICE.

LLOYD G. COPEMAN, OF FLINT, MICHIGAN.

BUSHING CONSTRUCTION.

Application filed June 25, 1923. Serial No. 647,602.

*To all whom it may concern:*

Be it known that I, LLOYD G. COPEMAN, a citizen of the United States, residing at Flint, in the county of Genesee and State of Michigan, have invented certain new and useful Improvements in Bushing Constructions, of which the following is a specification.

This invention relates to bushings for anchoring in molded articles and has for its object a simple but effective way of anchoring a bushing in a molded article against either being turned in the article or withdrawn from the same when it has hardened.

The bushing is primarily intended to form a screw socket in a stone work lining or shell such as a molded refrigerator lining or shell. The bushing is intended to take some of the fastening bolts or else some of the fastening devices for holding the exterior hardware to the refrigerator.

In the drawings:

Fig. 1 is a fragmentary perspective of a portion of a hollow tile intended as a door lining for a refrigerator.

Fig. 2 is a fragmentary section of a door lining and a door panel showing the bushing and fastening bolt.

Fig. 3 is a longitudinal section of a piece of tube of which the bushing is made.

Fig. 4 is a longitudinal section of the same after it has been flattened at one end to provide an anchor.

Fig. 5 is an elevation of the same after it has been flattened at one end.

Fig. 6 is an elevational view showing a modified form of construction.

Fig. 7 is an elevational view of the modified form showing the widened wedge portions.

$a$ designates a door lining or tile casting made of a semi-fluid material that hardens and sets. This shows the bushing $b$ set in the lug $x$ at one corner. This bushing is cast directly into the tile itself by being held in the molding flask by screws passing through the flask.

The bushing is made of a piece of tube $c$ such as shown in Fig. 3 which is tapped at one end to provide the screw threads. The opposite end of the bushing is flattened or swedged by suitable dies or by a hand instrument. This provides a spread portion which so flattens the end of the bushing that it cannot rotate in the hole which is formed in the molded article and it also spreads it out beyond the diameter of the bushing and the hole so that it cannot be drawn out longitudinally forming an absolutely secure anchor by a most simple method.

In Fig. 6 I have shown a modified form of bushing in which a relatively long tube $d$ is provided with a plurality of flattened portions $e$. The flattened portions spread out beyond the diameter of the tubing to prevent a longitudinal withdrawal of the tube from out of the casting.

I have found that the shorter bushing will not be satisfactory when used to fasten together members on which severe strains are placed. The single wedge at the end of the bushing will split or crack the cement when a severe load or strain is applied to the bushing. The use of a relatively long tube having a plurality of flattened portions is more satisfactory since the strain is carried by all the flattened portions and not by a single wedge. The distributing of the strain over the entire tube will lessen the likelihood of the cement splitting or cracking when a heavy load is applied to the bushing.

What I claim is:

In an article of the class specified, the combination of a moulded section of cementitious or frangible material, an anchor for fixtures or adjoining parts comprising a relatively thin gauge tube having a portion of its interior threaded and having a portion beyond such threaded interior flattened out so that the two walls are substantially doubled upon each other to increase the strength of the flattened portion and extended materially beyond the diameter of the threaded portion of the tube to materially increase the resistance against either a turning movement of the anchor or an extraction of the anchor from the moulded section by draft, and a screw or bolt turning into said threaded section of the bushing to secure the fixture or adjoining part in place.

In testimony whereof I affix my signature.

LLOYD G. COPEMAN.